United States Patent Office 3,036,880
Patented May 29, 1962

3,036,880
METHOD FOR CONSERVING WATER
John D. Malkemus, Austin, Tex., assignor to Jefferson Chemical Company, Inc., Houston, Tex., a corporation of Delaware
No Drawing. Filed Dec. 2, 1957, Ser. No. 699,925
9 Claims. (Cl. 21—60.5)

The present invention relates to a method for conserving water in reservoirs by applying a vapor-inhibiting film on the surface of the reservoir, and to the reservoir so protected.

Water conservation is a problem of major importance in a great many geographical areas where adequate sources of water are lacking. Recently, a solution was proposed which involves the application of a chemical agent to form a coating or film on the surface of the water to inhibit evaporation losses. Cetyl alcohol is such an agent and it has been applied with a certain degree of success.

In spite of the apparent value of cetyl alcohol the search for better agents has continued. Expansive bodies of water require substantial amounts of the film-forming agent with the result that more economical materials are desired. In addition, there is the need for more effective evaporation inhibitors, i.e., agents having superior vapor-inhibiting properties.

In accordance with the present invention there is provided an improved method for reducing the loss of water from reservoirs by the application of a novel film-forming agent to the surface of the water. The novel film-forming materials of the invention comprise the ethylene glycol and propylene glycol monoesters of long chain ($C_{14}$–$C_{22}$) fatty acids.

Acids suitable for preparing the monoester vapor inhibitors include the long chain monobasic fatty acids having from 14 to about 22 carbon atoms in the hydrocarbon chain. The fatty acid must have at least 14 carbon atoms since esters from the lower acids do not appear to offer any advantages. Typical fatty acids include stearic, oleic, palmitic, myristic, arachidic, behenic and mixtures thereof, in addition to commercial mixtures of fatty acids such as the fatty acids derived from tallow and tall oil. The monobasic acid is normally reacted with a compound effective to produce the desired ethylene glycol or propylene glycol monoester.

One method for preparing the glycol monoesters is to react the organic acid with a substantial excess of an alkylene gycol. A preferred method, however, is to react the organic acid with an alkylene oxide such as ethylene oxide or propylene oxide in the presence of a quaternary ammonium halide catalyst. Employing this method, ethylene glycol monostearate was prepared by reacting 342 grams of stearic acid with ethylene oxide in the presence of 3 grams of tetraethyl ammonium bromide. The reaction was conducted in a sealed reaction vessel provided with heating means. The stearic acid and quaternary ammonium bromide were introduced into the vessel and the latter sealed. Nitrogen was employed to flush air from the vessel and subsequently the reactant ethylene oxide was introduced to a pressure of 40 p.s.i.g. (pounds per square inch gauge). The reaction was conducted at a temperature of 120–130° C. The yield of ethylene glycol monostearate was approximately 90%.

The glycol monoester of the invention may be applied directly to the surface of the water reservoir as a dust or from cakes floating in the reservoir. Alternatively, the monoester may be applied as an emulsion or suspension in water. In practice, however, the glycol monoester is generally dissolved in a highly fluid inert organic solvent, which is substantially immiscible with and of lower specific gravity than water, prior to its application to the water reservoir. The solvent functions as a mobile inert carrier and facilitates spreading of the glycol monoester as a thin coating or film over the body of water. Suitable solvents for this purpose include benzene, xylene, heptane, octane, naphthas, kerosene, methyl isobutyl ketone, methyl ethyl ketone, butyl acetate, and butyl alcohol. It will be appreciated that as long as a film of glycol monoester is placed on the surface of the water, the method of application is not critical. The concentration of glycol monoester in the solvent is normally quite low to further facilitate spreading of this material. Normally the concentration of glycol monoester in the solvent will be 10% or less, preferably about 1%. The monoester is usually applied in the proportion of at least ½ pound per acre of water surface, preferably about 1–3 pounds per acre. While of course larger quantities can be employed with satisfactory results, from the standpoint of economy and practical effectiveness it is considered unnecessary to exceed about 5 pounds per acre and usually 1–2 pounds per acre properly spread provide the desired efficient evaporation retarding film.

The following examples illustrate the effectiveness of this invention.

*Example I*

Three glass trays, size 8.5 x 13 x 1.5 inches were filled with water to a depth of 30 mm. (millimeters). 2 ml. (milliliters) of a 1% solution of ethylene glycol monostearate in benzene were added to the first tray, this corresponding to the addition of about 2 pounds of monoester per acre of water surface. 2 ml. of a 1% solution of cetyl alcohol in benzene were added to the second tray and the third tray acted as a blank, no film former having been added. The three trays were exposed to the weather on a roof during normal dry summer weather in the southern part of the United States and the level of the water measured at intervals. After four days, there was 12 mm. of water in the first tray, 6 mm. of water in the second tray and 1 mm. of water in the blank or third tray. After five days the tray containing ethylene glycol monostearate had 5 mm. of water while the other two trays were dry. This example illustrates the surprising effectiveness of a glycol monoester as an evaporation inhibitor for reservoirs of water.

*Example II*

This example was similar to Example I except that glycol monoesters of palmitic acid and oleic acid were separately employed in addition to ethylene glycol monostearate and cetyl alcohol.

After three days exposure the tray containing cetyl alcohol had 1 mm. of water left. In contrast, the tray containing ethylene glycol monostearate had 9 mm. of water and the tray with ethylene glycol monopalmitate had 3 mm. of water left while the tray with ethylene glycol monooleate was substantially the same as that containing the cetyl alcohol.

Under similar conditions, ethylene glycol monolaurate was not very effective since a tray of water with this film was dry after three days.

*Example III*

This example was conducted in the same manner as Examples I and II. The trays were filled with water to a depth of 30 mm. and exposed to the atmosphere on a roof. 2 ml. of a 1% solution of the additive in benzene were added to the water in the trays. One run was conducted as a blank containing no additive. The following observations were taken:

| Tray No. | Additive | Depth of water in mm. after 4 days' exposure |
|---|---|---|
| 1 | Ethylene glycol monostearate | 6 |
| 2 | Propylene glycol monostearate | 5 |
| 3 | Ethylene glycol monoesters of mixed $C_{14}$-$C_{22}$ acids | 6 |
| 4 | Ethylene glycol monoesters of tall oil fatty acids | 2 |
| 5 | Cetyl alcohol | Dry |
| 6 | No additive | Dry |

While the present invention is particularly adapted to conserve water stored in reservoirs, it is obvious that it is useful generally in inhibiting the evaporation of water, such as in storage tanks.

Obviously many modifications and variations of the invention, as hereinbefore set forth, may be made without departing from the spirit and scope thereof, and therefore only such limitations should be imposed as are indicated in the appended claims.

I claim:
1. A method for inhibiting the evaporation of water which comprises applying on the exposed surface of the water a film of a glycol monoester selected from the group consisting of the ethylene and propylene glycol monoesters of $C_{14}$-$C_{22}$ fatty acids.
2. A method according to claim 1 in which said glycol monoester is applied as a dilute solution in an organic solvent which is immiscible with and of lower specific gravity than water.
3. A method according to claim 2 in which said solvent is benzene.
4. A method for conserving water in reservoirs by inhibiting evaporation which comprises applying on the surface of the water a film of ethylene glycol monostearate.
5. A method for conserving water in reservoirs by inhibiting evaporation which comprises applying to the surface of the water a film of ethylene glycol monopalmitate.
6. A method for conserving water in reservoirs by inhibiting evaporation which comprises applying on the surface of the water a film of propylene glycol monostearate.
7. A method for conserving water in reservoirs by inhibiting evaporation which comprises applying on the surface of the water a film of a glycol ester selected from the group consisting of ethylene and propylene glycol monoesters of fatty acids having from 14 to 22 carbon atoms in the hydrocarbon chain.
8. The process according to claim 7 in which said glycol ester is applied as a dilute solution in an organic solvent which is immiscible with and of lower specific gravity than water.
9. The process according to claim 8 in which said film contains from 0.5 to 5.0 pounds of said glycol ester per acre of water surface.

References Cited in the file of this patent

Archer et al.: "The Rate of Evaporation of Water Through Fatty Acid Monolayers," Journal of Physical Chemistry, vol. 59, No. 3, March 1955.

Mansfield: "Influence of Monolayers on the Natural Rate of Evaporation of Water," Nature, vol. 175, February 1955, pp. 247–249.

La Mer et al.: "The Rate of Evaporation of Water Through Monolayers of Esters, Acids, and Alcohols," Journal of Physical Chemistry, March 1956, vol. 60, p. 348.